United States Patent
Falcone et al.

(10) Patent No.: US 9,205,506 B2
(45) Date of Patent: Dec. 8, 2015

(54) WELD COMPENSATION DEVICE

(71) Applicant: Kawasaki Robotics (USA), Inc., Wixom, MI (US)

(72) Inventors: Maximiliano A. Falcone, Ortonville, MI (US); Zhengyuan Sam Yang, Farmington Hills, MI (US); John C. Siemer, Howell, MI (US); Paul M. Betz, Scottsdale, AZ (US)

(73) Assignee: Kawasaki Robotics (USA), Inc., Wixom, MI (US)

( * ) Notice: Subject to any disclaimer, the term of this patent is extended or adjusted under 35 U.S.C. 154(b) by 399 days.

(21) Appl. No.: 13/734,756

(22) Filed: Jan. 4, 2013

(65) Prior Publication Data

US 2014/0190950 A1 Jul. 10, 2014

(51) Int. Cl.
*B23K 9/095* (2006.01)
*B23K 5/06* (2006.01)
*B23K 5/22* (2006.01)
*B23K 9/02* (2006.01)
*B23K 9/035* (2006.01)
*B23K 9/127* (2006.01)
*B23K 9/167* (2006.01)
*B23K 9/173* (2006.01)
*B23K 37/04* (2006.01)
*B23K 37/047* (2006.01)
*B23K 37/06* (2006.01)
*B23K 26/26* (2014.01)
*B23K 26/30* (2014.01)

(52) U.S. Cl.
CPC ... *B23K 5/06* (2013.01); *B23K 5/22* (2013.01); *B23K 9/02* (2013.01); *B23K 9/035* (2013.01); *B23K 9/1274* (2013.01); *B23K 9/1278* (2013.01); *B23K 9/167* (2013.01); *B23K 9/173* (2013.01); *B23K 26/26* (2013.01); *B23K 26/422* (2013.01); *B23K 37/047* (2013.01); *B23K 37/0461* (2013.01); *B23K 37/06* (2013.01)

(58) Field of Classification Search
CPC ...... B23K 37/06; B23K 9/0235; B23K 9/095; B23K 9/0352; B23K 9/026; B23K 26/26; B23K 26/422
USPC .............. 219/137 R, 158, 159, 125.1, 121.45
See application file for complete search history.

(56) References Cited

U.S. PATENT DOCUMENTS

| | | | | | |
|---|---|---|---|---|---|
| 2,176,602 | A | * | 10/1939 | Beck et al. | 228/158 |
| 2,618,846 | A | * | 11/1952 | Morris et al. | 72/47 |
| 3,251,526 | A | * | 5/1966 | Agnew et al. | 228/50 |
| 3,829,651 | A | * | 8/1974 | Olshansky et al. | 219/121.14 |
| 3,839,619 | A | * | 10/1974 | Normando et al. | 219/126 |
| 4,544,825 | A | * | 10/1985 | Cook | 219/137 R |

* cited by examiner

*Primary Examiner* — Mark Paschall
(74) *Attorney, Agent, or Firm* — Alleman Hall McCoy Russell & Tuttle LLP

(57) ABSTRACT

The present disclosure is directed to devices and methods for automating weld termination. In one embodiment, a compensation device is provided to grip a weld dam comprised of silicon dioxide. The compensation device is used to impart linear motion along an x-axis, y-axis, and z-axis, and rotational motion about the z-axis, to the weld dam. Via the imparted linear and rotational motion, the weld dam is then abutted against a surface of a workpiece, the workpiece comprising a first and a second section. In some embodiments, the workpiece surface includes uneven terminal ends of the first and second sections. In other embodiments, the workpiece surface is a bottom surface.

20 Claims, 7 Drawing Sheets

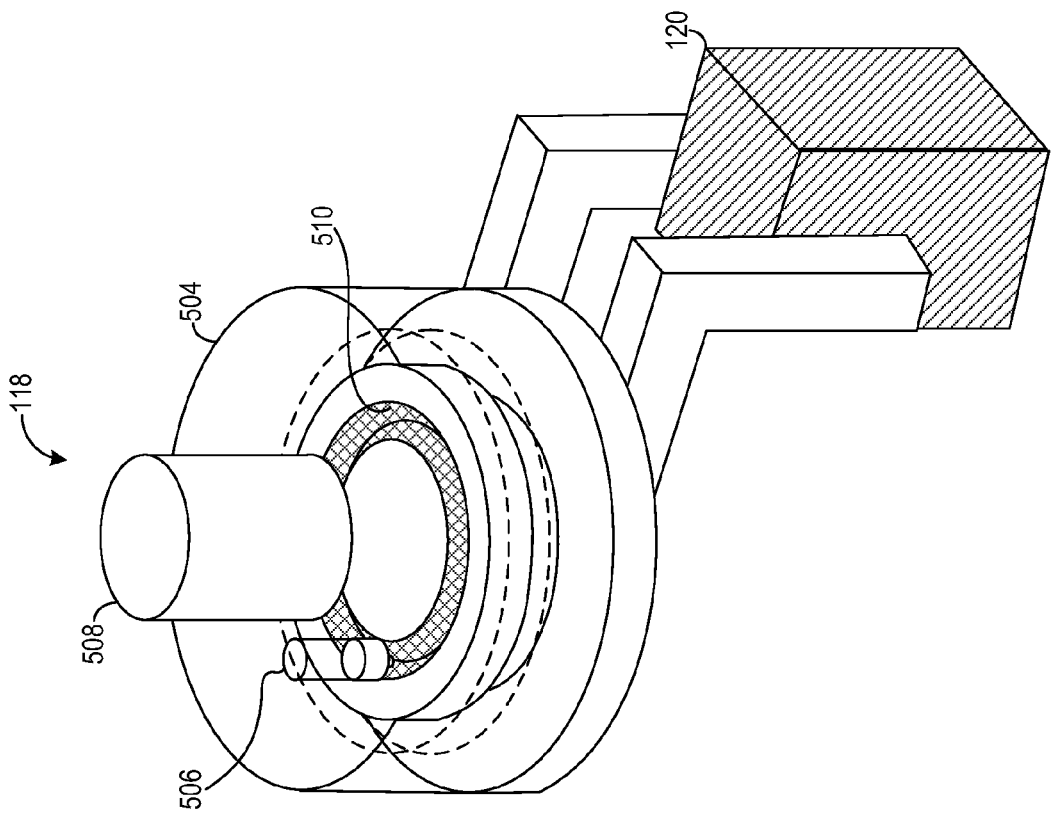
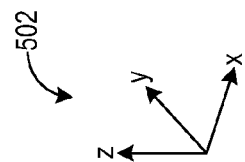
FIG. 5

WELD COMPENSATION DEVICE

BACKGROUND

In some types of welding, molten metal is applied to a groove between two objects to join them together. Molten metal may be applied until a termination point in the groove is reached. Appropriately terminating the weld at the termination point is important for obtaining a weld with sufficient structural integrity and for preventing molten metal from flowing to undesired locations. Terminating such a weld, however, presents several challenges.

In some approaches, a weld is terminated by blocking molten metal at the termination point manually by an operator. Such an approach, however, may not produce a desired repeatability among welds and may be costly and dangerous. Weld termination may instead be automated, though both approaches encounter difficulty when terminating a weld against an uneven surface. In this scenario, insufficient weld termination may weaken welds and fail to prevent undesired molten metal flow.

SUMMARY

The present disclosure is directed to devices and methods for automating weld termination. In one embodiment, a compensation device is provided to grip a weld dam comprised of silicon dioxide. The compensation device is used to impart linear motion along an x-axis, y-axis, and z-axis, and rotational motion about the z-axis, to the weld dam. Via the imparted linear and rotational motion, the weld dam is then abutted against a surface of a workpiece, the workpiece comprising a first and a second section. In some embodiments, the workpiece surface includes uneven terminal ends of the first and second sections. In other embodiments, the workpiece surface is a bottom surface.

In this way, a weld may be dammed to prevent molten metal from flowing to undesired locations and weld termination automated. Such undesired molten metal flow may be prevented for workpieces with uneven surfaces to which a weld dam is abutted. Further, open root weld termination may be automated and open root welds backed.

BRIEF DESCRIPTION OF THE DRAWINGS

FIG. 5 schematically shows a compensation device in accordance with an embodiment of the present disclosure.

DETAILED DESCRIPTION

The present disclosure is directed to automated weld termination. As described in more detail below, a compensation device is used to grip a weld dam comprised of silicon dioxide. The compensation device is used to impart linear motion along an x-axis, y-axis, and z-axis, and rotational motion about the z-axis, to the weld dam. The weld dam is then abutted via imparted motion against a surface of a workpiece comprising a first section and a second section, automating weld termination.

Figure 1:
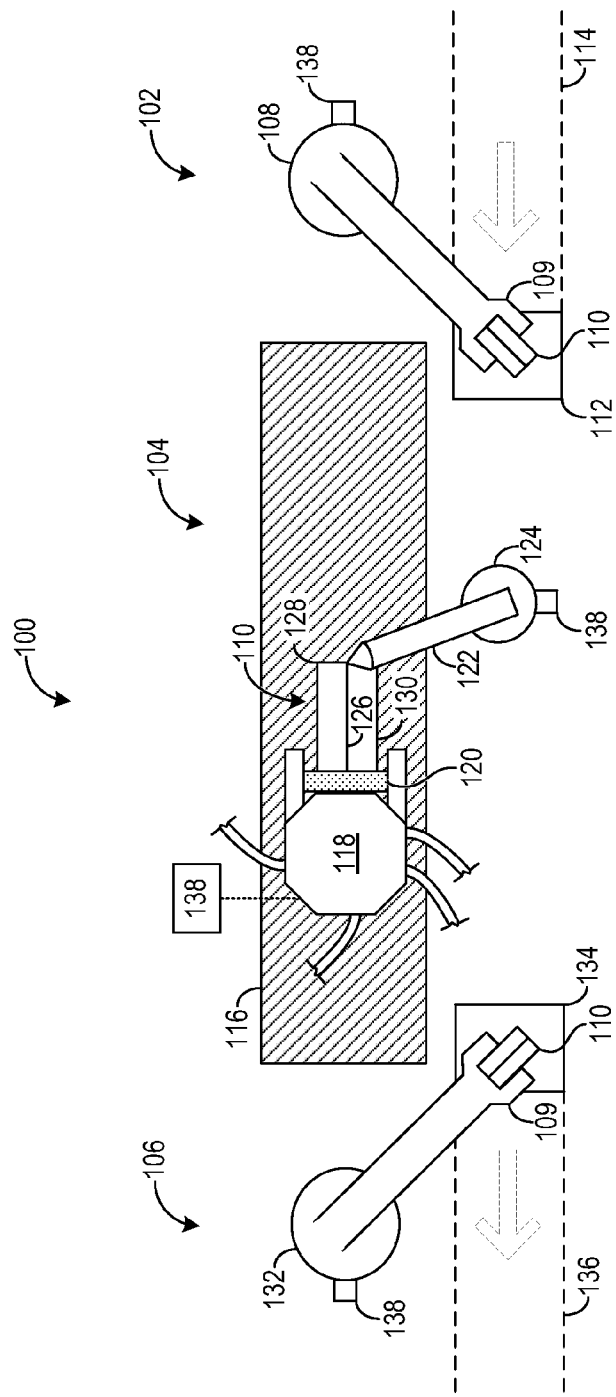
FIG. 1 schematically shows a plan view of a weld environment in accordance with an embodiment of the present disclosure.

FIG. 1 schematically shows a plan view of a weld environment 100 configured to facilitate an automated weld process which may include manual aspects. As shown, weld environment 100 comprises three stages: a carry-in stage 102, a weld stage 104, and a carry-out stage 106. In totality, the stages are configured to carry in a workpiece to weld environment 100, apply a weld to the workpiece, and carry out the workpiece for further processing.

At carry-in stage 102, a carry-in robot 108 carries in a workpiece 110 for welding in weld environment 100. Workpiece 110 is simultaneously shown in carry-in stage 102, weld stage 104, and carry-out stage 106, though it will be understood that each instance of workpiece 110 may be a unique workpiece, with every workpiece substantially having the same material composition and dimensions. In other embodiments, workpieces may possess any suitable variety of dimensions according to the types of workpieces which may be welded and processed in weld environment 100. Workpieces may be carried in from an external location, or, for example, from a carry-in platform 112 configured to stage workpieces on a level surface and in a rotational orientation suitable for handling by carry-in robot 108. Further, carry-in platform 112 may be connected to an inbound conveyor 114 which may automatically transport workpieces into weld environment 100 from right to left and place them in the position shown on carry-in platform 112.

Carry-in robot 108 includes a grip 109 having a shape suited for gripping workpiece 110 at its lateral sides. Having attained a sufficient grip, carry-in robot 108 moves workpiece 110 via rotational and/or translational motion to a weld platform 116, which is configured to receive and support workpiece 110 during welding. As shown in FIG. 1, the reach of carry-in robot 108 is such that it places workpiece 110 at a right edge of weld platform 116. However, such reach may vary without departing from the scope of this disclosure, and in some embodiments the reach of carry-in robot 108 may be such that it places workpieces substantially at a center of weld platform 116.

Weld platform 116 provides a supportive, level surface on which workpieces may be received and welded. In some embodiments, weld platform 116 is a static surface which does not impart motion to a workpiece. In other embodiments, weld platform 116 is a conveyor which receives a workpiece at the right end, pulls the workpiece leftward toward a center of the platform, and finally pulls the workpiece toward a left end of the platform after welding, at which point the workpiece may be carried out for further handling. Weld platform 116 may include a plurality of jigs (not shown) to which workpieces may be affixed for increased stability. Moreover, weld platform 116 may comprise a plurality of lanes (not shown) which each support a workpiece. In this way, the throughput of weld environment 100 may be increased by allowing multiple workpieces to be welded simultaneously.

Once workpiece 110 is placed at the center of weld platform 116, the weld process may be initiated at weld stage 104. FIG. 1 shows a compensation device 118 gripping and abutting a weld dam 120 against a terminal end of workpiece 110. As shown, compensation device 118 is coupled to an octagonal actuating robot. Their individual and cooperative operation is further described below. Weld dam 120 is configured to prevent molten metal applied by a weld torch 122 from flowing into undesired locations. As the weld process begins, weld torch 122 moves, via rotational, translational, sinusoidal, or any other suitable motion provided by a weld robot 124 to which it is coupled, from right to left along a weld groove 126. Weld robot may have the capability to span the vertical length of weld platform 116 and its lanes, if they are included. The molten metal applied by weld torch 122 along weld groove 126 joins together a first section 128 and a second section 130 of workpiece 110. Once weld torch 122 reaches the terminal end of workpiece 110, the weld process is terminated. Molten metal applied by the process is prevented from flowing beyond this terminal end by the abutment of weld dam 120. Alternatively or additionally, workpieces may be backed and molten metal prevented from flowing beyond their bottom surfaces in weld environment 100, described in further detail below with reference to FIG. 4. It will be appreciated that multiple weld robots may be included in weld environment 100, and, in the embodiment in which weld platform 116 includes multiple lanes, one weld robot may be provided per lane.

After deposition of molten metal by weld torch 122 has completed, the molten metal is allowed to set and cool for a predetermined amount of time, thereby ensuring that a sufficient structural integrity is attained. Sufficient solidification of the molten metal is also ensured. Once the predetermined amount of time is reached, compensation device 118 removes weld dam 120 from the terminal end of workpiece 110. Operation then proceeds to carry-out stage 106, whereat a carry-out robot 132 removes workpiece 110 via its grip 109 from weld platform 116 and places workpiece 110 on a carry-out platform 134. Like carry-in platform 112, carry-out platform 134 may be connected to an outbound conveyor 136 which carries welded workpieces out of weld environment 100 for further processing. Similarly, carry-out robot 132 may be configured like carry-in robot 108 but suited for removing workpieces from weld platform 116.

The above described robots, including carry-in robot 108, weld robot 124, and carry-out robot 132, may be articulated robots. The robots may have three degrees of freedom, including rotational and translational degrees of freedom, though this number may be varied without departing from the scope of this disclosure. The robots may further engage in any other suitable types of motion, including sinusoidal motion. The reach of each robot may also be varied, for example depending on whether weld platform 116 is a static surface or a conveyor. The robots may be servo-controlled with a spatial accuracy and repeatability on the order of +/−2 millimeters or less. However, it will be appreciated that such spatial accuracy and repeatability is provided as a non-limiting example, and that these parameters may be varied without departing from the scope of this disclosure. In some examples, these parameters may vary depending on the types of welds and/or workpieces welded in weld environment 100. Carry-in and carry-out robots 108 and 132 are also shown as non-limiting examples; conveyor and transfer devices may instead be used to implement their functions. Further, carry-in and carry-out robots 108 and 132 may be omitted from weld environment 100 and their functions carried out by human operators without departing from the scope of this disclosure.

As shown in FIG. 1, each robot includes a controller 138 configured to carry out the motions and routines described above, together facilitating a weld process. Alternatively, the robots may be commonly coupled to a single controller. Moreover, control functions may be distributed across specific controllers. For example, one controller may control weld robot 124, while another controller may control carry-in and carry-out robots 108 and 132. Such controller(s) may be configured to implement a continuous path control scheme in which each point along a desired path (e.g., the path extending from carry-in platform 112 to weld platform 116) is specified. An exemplary controller in accordance with the present disclosure and configured to carry out the motions and routines described herein is described below with reference to FIG. 7.

Weld robot 124 may use any suitable techniques for achieving proper placement of weld torch 122 during the weld process. Such techniques include tactile sensing and visual sensing, the latter accomplished for example with the inclusion of a laser sensor (not shown). Moreover, such techniques may be augmented with the formation of a compensation table. In this approach, a test workpiece identical to workpiece 110 is sensed using a test robot (not shown) having the same sensor(s) included in weld robot 124 (e.g., tactile and/or laser sensor(s)). Position errors are then generated and used to generate the compensation table, which is accessed by controller 138 of weld robot 124 during the weld process. In this way, accurate welding may be achieved by referencing previously generated errors to minimize current errors.

The above discussed techniques may be used with various welding technologies, including arc welding, gas welding, energy beam welding, or other techniques. Thus, weld torch 122 may be a welding device such as a gas torch, electric arc unit, laser beam unit, ultrasound unit, etc. Specific types of welding include gas metal arc welding (GMAW), metal inert gas (MIG) welding, tungsten inert gas (TIG) welding, oxyacetylene welding (OAW), gas tungsten arc welding (GTAW), submerged arc welding (SAW), etc. However, it will be appreciated that these examples are non-limiting and that other suitable techniques may be used without departing from the scope of this disclosure.

Weld environment 100 may include additional components not shown in FIG. 1. For example, weld environment 100 may include an inspection robot configured to determine the spatial orientation of an inbound workpiece before being processed and welded by weld robot 124. The inspection robot may include a laser sensor to determine such spatial orientation. Weld environment 100 may also include an inspection robot configured to inspect and measure a welded workpiece before being processed by carry-out robot 132. Still further, a plurality of shields may be included in weld environment 100 to prevent splashing and propagation of molten metal to undesired locations. Although the weld process implemented by weld environment 100 is shown as proceeding from right to left, the weld process may instead proceed from left to right without departing from the scope of this disclosure. In such an embodiment, for example, weld robot 124 may be configured to weld workpieces from left to right.

Figure 2:
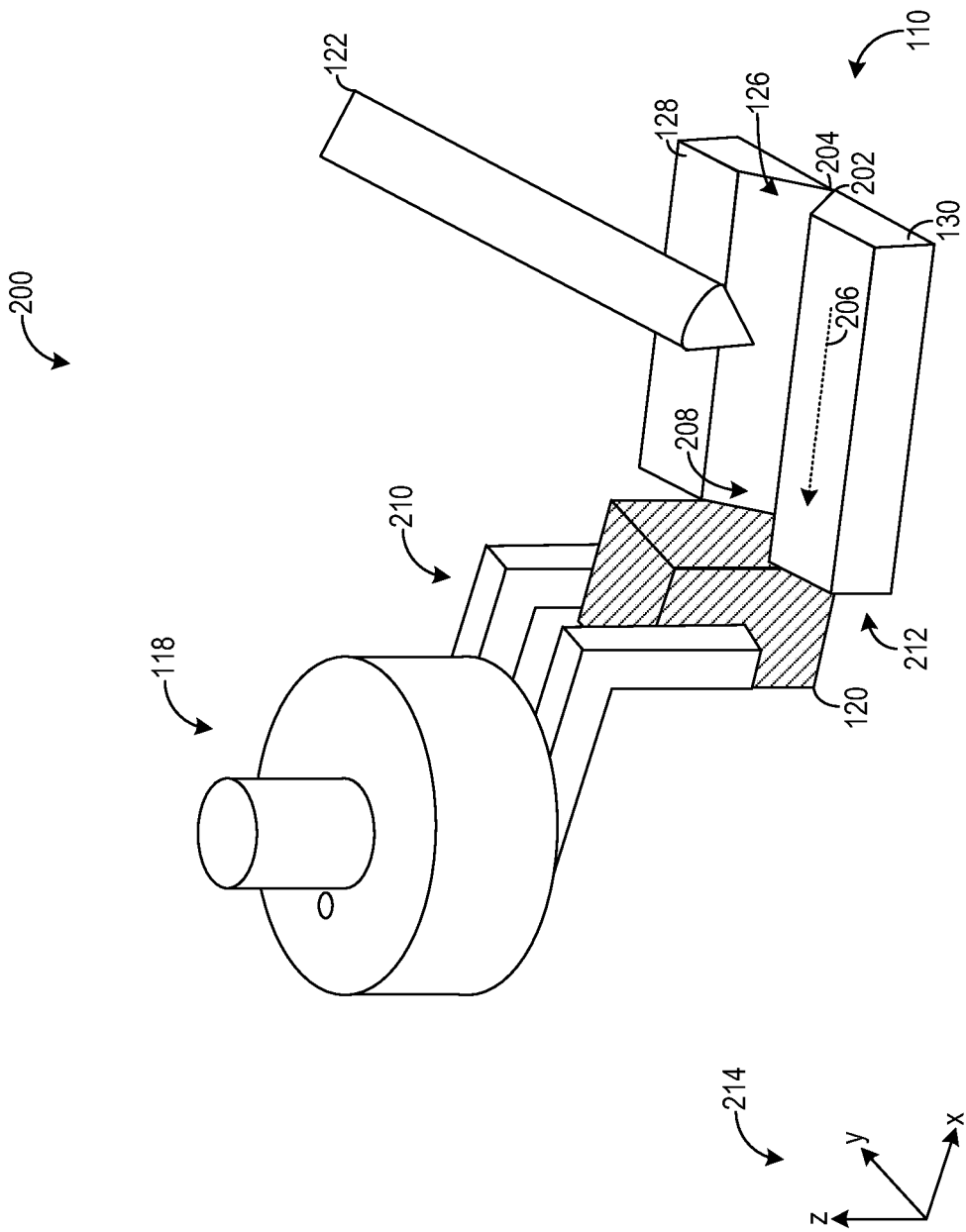
FIG. 2 shows an exemplary weld dam arrangement in accordance with an embodiment of the present disclosure.

Turning now to FIG. 2, an exemplary weld dam arrangement 200 is shown, further illustrating how weld dam 120 may be abutted via compensation device 118 against workpiece 110 in weld environment 100. Reference numerals are repeated throughout the figures where appropriate.

In the illustrated example, weld dam arrangement 200 is prepared to carry out welding of workpiece 110. Workpiece 110 includes first section 128 and second section 130, which may be comprised of metal (e.g., steel) or any other type of material suitable for welding. As shown, first and second sections 128 and 130 are oriented such that they resemble rectangular blocks with laterally-oriented opposing faces which slope outward as the sections are traversed downward in a vertical direction. The opposing faces truncate with opposing edges 202 and 204, which, in the illustrated example, are positioned adjacent each other and at least partially form a bottom of a weld groove 126. It is in the space provided by weld groove 126 that welding of workpiece 110 and its sections is carried out, for example by weld torch 122. It will be understood that opposing edges 202 and 204 may be placed in contact with each other, substantially apart, or any distance therebetween without departing from the scope of this disclosure. Particular weld approaches may depend on this separation distance, as described in further detail below.

A weld process may be carried out in which first and second sections 128 and 130 are welded together along opposing edges 202 and 204 by moving a weld torch (e.g., weld torch 122), weld tip, or other welding device through weld groove 126 along a weld direction 206. Weld torch 122 or another welding device may then stop at a weld joint termination point 208, where molten metal produced by the welding process is blocked by weld dam 120 and prevented from flowing beyond weld joint termination point 208. In other words, weld dam 120 prevents molten metal from flowing beyond an intended weld region that would otherwise be open. Such blockage facilitates the formation of a structurally sound weld while preventing molten metal from flowing to undesired locations, and is referred to herein as "weld termination".

In the example shown in FIG. 2, compensation device 180 includes a pair of grip arms 210 gripping weld dam 120 at its lateral sides. Compensation device 180 may be controlled to automatically grip and abut weld dam 120 against a terminal end surface 212 of workpiece 110 to thereby automate weld termination. Compensation device 180 may include a plurality of degrees of freedom and may, for example, possess the capability to move throughout x, y, and z axes in a coordinate system 214. Additional detail regarding compensation device 180 and its operation is provided below with reference to FIGS. 3, 5, and 6.

In the illustrated embodiment, weld dam 120 is shown as a rectangular block, as its geometric shape substantially corresponds to terminal end surface 212 to which it is abutted. As such, the ability of weld dam 120 to prevent undesired molten metal flow is maximized. Other shapes and geometric configurations are possible, however, without departing from the scope of this disclosure. Weld dams may be provided with surfaces or contours profiled to terminal end surfaces of workpieces with non-rectangular shapes. As non-limiting examples, convex or concave weld dams may be provided.

Weld dam 120 is comprised of silicon dioxide, which may present potential advantages over dams comprised of other materials. Dams comprised of copper, for example, may transfer copper into the weld before it has fully cooled, contaminating the weld with impurities and potentially degrading the weld's structural integrity. The welding process may then have to expend time and resources removing such impurities, for example via machining and re-welding. In contrast, because of its material composition of silicon dioxide, weld dam 120 may reduce or eliminate impurity transfer into the weld. As such, welding processes in accordance with the present disclosure need not expend the time and resources to remove impurities and reform the weld.

Weld dam 120 may further be reused for multiple welds due to its material composition. Ceramic dams, for example, are generally limited to a single use per weld and are generally more brittle and sensitive to heat inherent in the weld process. As such, the use of weld dam 120 may reduce cost and waste during the weld process.

In the illustrated example, weld dam 120 is comprised of silicon dioxide with a purity of 99.995%. However, it will be appreciated that the potential advantages described above may be achieved with other levels of purity. Moreover, silicon dioxide may be mixed with other select substances while still achieving the benefits described above.

After a weld has completed—in other words, has traversed the length of opposing edges 202 and 204 along weld direction 206 while depositing molten metal and reached weld joint termination point 208, weld dam 120 may be removed for potential reuse, exposing terminal end surface 212 of workpiece 110 and first and second sections 128 and 130. In one approach, weld dam 120 is removed after a predetermined period of time. Such a period of time, for example, may allow molten metal applied by a weld torch (e.g., weld torch 122), weld tip, or other weld device to substantially solidify to a point at which it will no longer flow beyond weld joint termination point 208. As a non-limiting example, the predetermined amount of time is 1.5 seconds. In another approach, weld dam 120 is allowed to release by its own weight after a longer period of time. In this example, weld dam 120 may become adhered to terminal end surface 212 of workpiece 110 and/or the terminal end of the applied molten metal. After the longer period of time, the molten metal may solidify to the extent that the gravitational force acting on weld dam 120 overcomes the diminishing adherence force, allowing the weld dam to release by its own weight. As one non-limiting example, the longer period of time is 40 seconds. In weld environment 100, a detached weld dam may be handled by compensation device 118 or another suitably configured robot.

Figure 3:
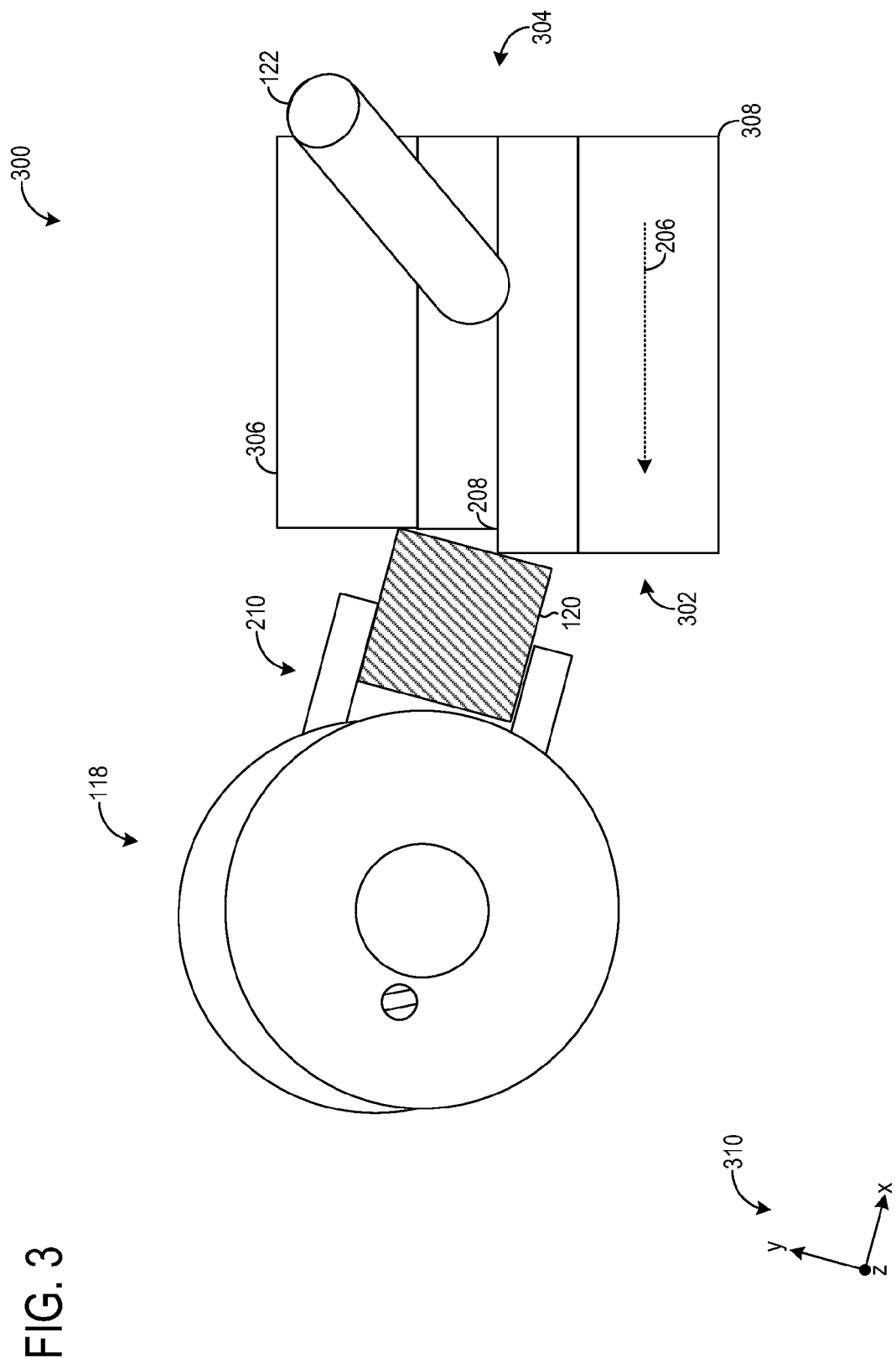
FIG. 3 shows an exemplary weld dam mismatch arrangement in accordance with an embodiment of the present disclosure.

Turning now to FIG. 3, an exemplary weld dam mismatch arrangement 300 is shown. Mismatch arrangement 300 illustrates a scenario in which compensation device 118 abuts weld dam 120 against an uneven terminal end surface 302 of a workpiece 304. In this example, the terminal end surface of a second section 308 is closer to compensation device 118 and weld dam 120 than the terminal end surface of a first section 306. Compensation device 118 is thus unable to obtain flush abutment between weld dam 120 and terminal end surface 302. A mismatch compensation procedure may be engaged in response.

In one embodiment, the mismatch compensation procedure includes first moving weld dam 120 and placing it in contact with one of the terminal ends of first section 306 and/or second section 308. Contact with terminal ends may be detected by a variety of known methods, for example by detecting a deviation in the force or torque output of one or more motors operatively coupled to grip arms 210. Once initial contact with one section is achieved, secondary contact with the remaining section is sought. This may be accomplished, for example, with one or more heuristics which indicate where another workpiece section is or is likely to be located in relation to the first with which contact has been achieved. Once contact with both the first and second sections has been achieved, the procedure may end and the weld may be initiated. Alternatively, the procedure may cause compensation device 118 to perturb contact with one or both sections to optimize abutment. For example, if compensation device 118 has obtained initial contact with first section 306 and secondary contact with second section 308, it may subsequently rotate about the pivot formed between weld dam 120 and first section 306, in the x-y plane formed by a coordinate system 310. The procedures and heuristics described above may be stored and executed on a controller (e.g., controller 138) operatively coupled to compensation device 118. An exemplary controller in accordance with the present disclosure is described below with reference to FIG. 7.

Once abutment has been satisfactorily achieved, the weld may be carried out. However, a gap may still exist between the uneven terminal ends as shown in FIG. 3. In such a case, molten metal deposited during the weld may flow into undesired locations, for example beyond weld joint termination point 208. Further steps to prevent undesired molten metal flow may be taken in response. In some embodiments, the weld joint termination point may be moved to shorten the length of a weld. This may allow molten metal to sufficiently solidify before flowing into undesired locations. Alternatively or additionally, undesired molten metal flow due to the gap may be mitigated by a combined dam and backing approach, described in more detail below.

Figure 4:
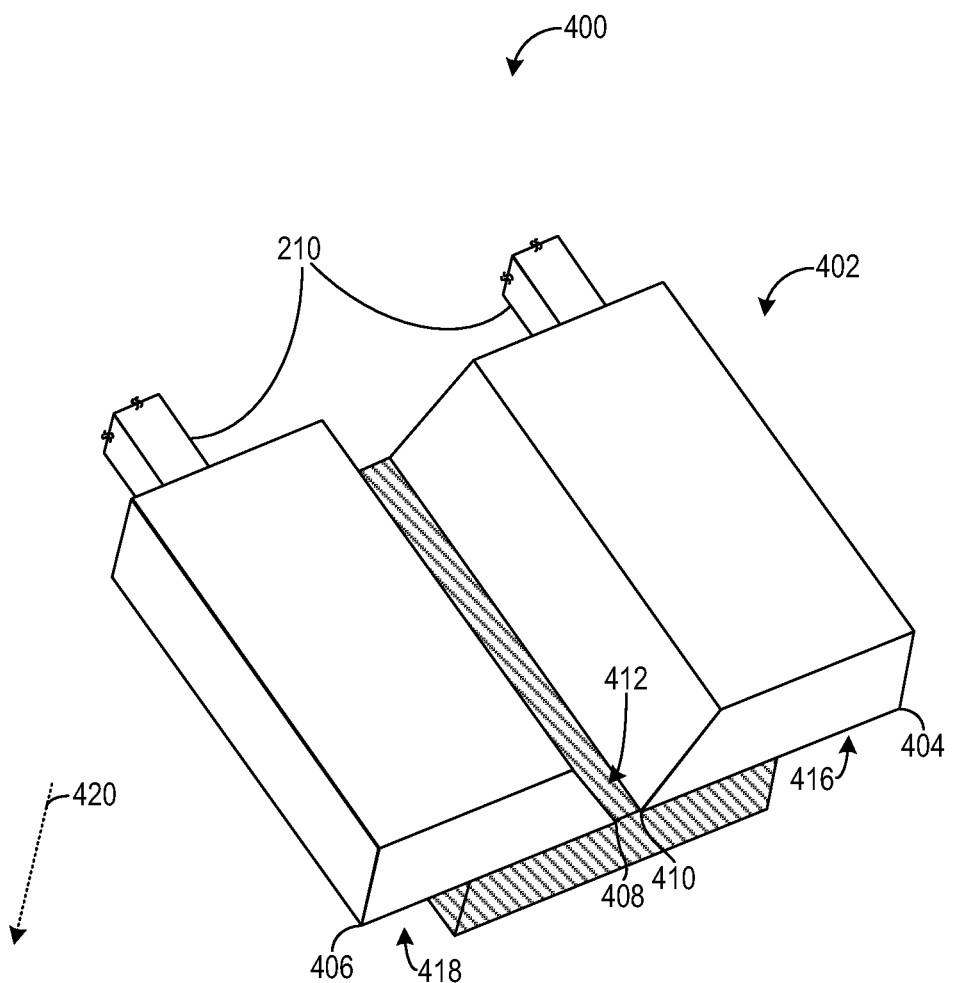
FIG. 4 shows an exemplary weld backing arrangement in accordance with an embodiment of the present disclosure.

Turning now to FIG. 4, a weld backing arrangement 400 is shown. Weld backing arrangement 400 includes a workpiece 402 comprising a first section 404 and a second section 406, having opposing edges 408 and 410, respectively. Unlike the arrangements described above, opposing edges 408 and 410 are adjacent each other but substantially separated. Opposing edges 408 and 410 thus form at least partially a bottom of an open root 412 in which molten metal may be deposited to join together first and second sections 404 and 406. Such a weld may be designated a "complete joint penetration weld". Open roots and complete joint penetration welding may be applicable to structural welds and fabrication of lengthy components—e.g., crane booms and ship and locomotive components.

Weld backing arrangement 400 further includes a weld backer 414 backed against bottom surfaces 416 and 418 of first and second sections 404 and 406 and against open root 412. In the illustrated example, weld backer 414 has a rectangular geometry with a length that spans the lengths of first and second sections 404 and 406. As welding is carried out, weld backer 414 may facilitate the formation of a weld with appropriate geometry and sufficient structural integrity in open root 412, and may be moved by grip arms 210 of compensation device 118. Further, weld backer 414 may prevent molten metal applied by the weld from flowing below bottom surfaces 416 and 418 in a vertical direction 420.

While the approach described above may be appropriate for certain types of applications, it may be less desirable when applied to the fabrication and welding of lengthy components—a longer weld backer would be required, increasing cost and the complexity of the weld process. In such a case, weld backer 414 may have a length substantially less than the length of a workpiece to which it is applied. To compensate, weld backer 414 may be moved manually or automatically (e.g., by compensation device 118) along the direction in which welding is carried out. Weld backer 414 may be moved in predetermined amounts along the weld direction, interrupted by periods of non-movement to allow the weld to solidify to a desired extent. Alternatively, weld backer 414 may be moved continuously at a rate that facilitates the sufficient solidification of the weld. Upon successful completion of a weld, weld backer 414 may be removed, for example by compensation device 118 to expose bottom surfaces 416 and 418.

As described above with reference to weld dam 120, weld backer 414 may possess alternative geometries to that shown FIG. 4. A curved, contoured weld backer may instead be used, for example to back the welding of circular components such as pipes. It will be appreciated, however, that such contoured geometry is provided as a non-limiting example and that virtually any profiled geometry is possible without departing from the scope of this disclosure.

Like weld dam 120, weld backer 414 is comprised of silicon dioxide, thus the potential advantages described above apply, including non-contamination of welds. The material composition of weld backer 414 may be further advantageous when moved as molten metal is applied, for example when welding lengthy components. Weld backers comprised of ceramics, for example, may not be used in this scenario as their material composition tends to cause cracking in the ceramic material itself. Consequently, such ceramic weld backers may not be reused.

A weld dam and weld backer may be simultaneously applied to a workpiece for a combined dam and backing approach. In such an embodiment, a weld dam is abutted against a terminal end of a workpiece, preventing molten metal from flowing beyond a desired weld joint termination point. A weld backer is also backed against a bottom surface of the workpiece, preventing molten metal from flowing below this surface. The formation of a weld with appropriate geometry and sufficient structural integrity may thus be facilitated.

Such a combined approach may implement separate weld dams and backers, or may combine the two to form a contiguous weld dam and backer. The latter approach may be applicable to welds of smaller lengths. Returning to FIG. 3, molten metal flowing beyond weld joint termination point 208 due to misalignment of the terminal ends of first and second sections 306 and 308 may be caught by the backing portion of the combined weld dam and backer.

Turning now to FIG. 5, compensation device 118 is schematically shown in greater detail. In this embodiment, compensation device 118 has four degrees of freedom, including three degrees of linear freedom along an x-axis, a y-axis, and a z-axis in a coordinate system 502, and a fourth rotational degree of freedom about the z-axis. Compensation device 118 may be operatively coupled to an actuating robot described below and may impart motion via the four degrees of freedom to an object (e.g., weld dam 120) held in its grip arms 210. It will be appreciated, however, that different numbers of degrees of freedom are possible without departing from the scope of this disclosure, for example six degrees of freedom comprising linear and rotational motion about the x, y, and z axes.

Compensation device 118 includes a compensation hub 504 in which a plurality of components are disposed to facilitate the linear and rotational motion described above. A pressure shaft 506 generates a back pressure responsive to a received fluid, the back pressure controlling the distance through which compensation hub 504 moves along the x and y axes. Pressure shaft 506 may be pneumatically coupled to an actuating robot, as described in further detail below. An actuating cylinder 508 controls linear motion of compensation hub 504 along the z-axis, and may be, for example, a spring or air cylinder. In such embodiments, the spring constant, which determines the relationship between a supplied force and the resulting motion output, may be adjustable. In other embodiments, actuating cylinder 508 may be servo, electrically, mechanically, or hydraulically driven. A rotation groove 510, configured to control rotational motion of compensation hub 504 about the z-axis, is also included. Collectively, such components allow objects (e.g., a weld dam) to be placed in a desired three-dimensional location, by imparting the linear and rotational motion described above to the objects.

In some embodiments, compensation device 118 may be housed in a spatial fixture (not shown), bounding its range of motion to a particular region where a workpiece may be found. Such a fixture may increase the spatial accuracy and repeatability of compensation device 118. As one non-limiting example, compensation device 118 may have a spatial repeatability of +/−2 mm or less, with the inclusion of the spatial fixture.

Figure 6:
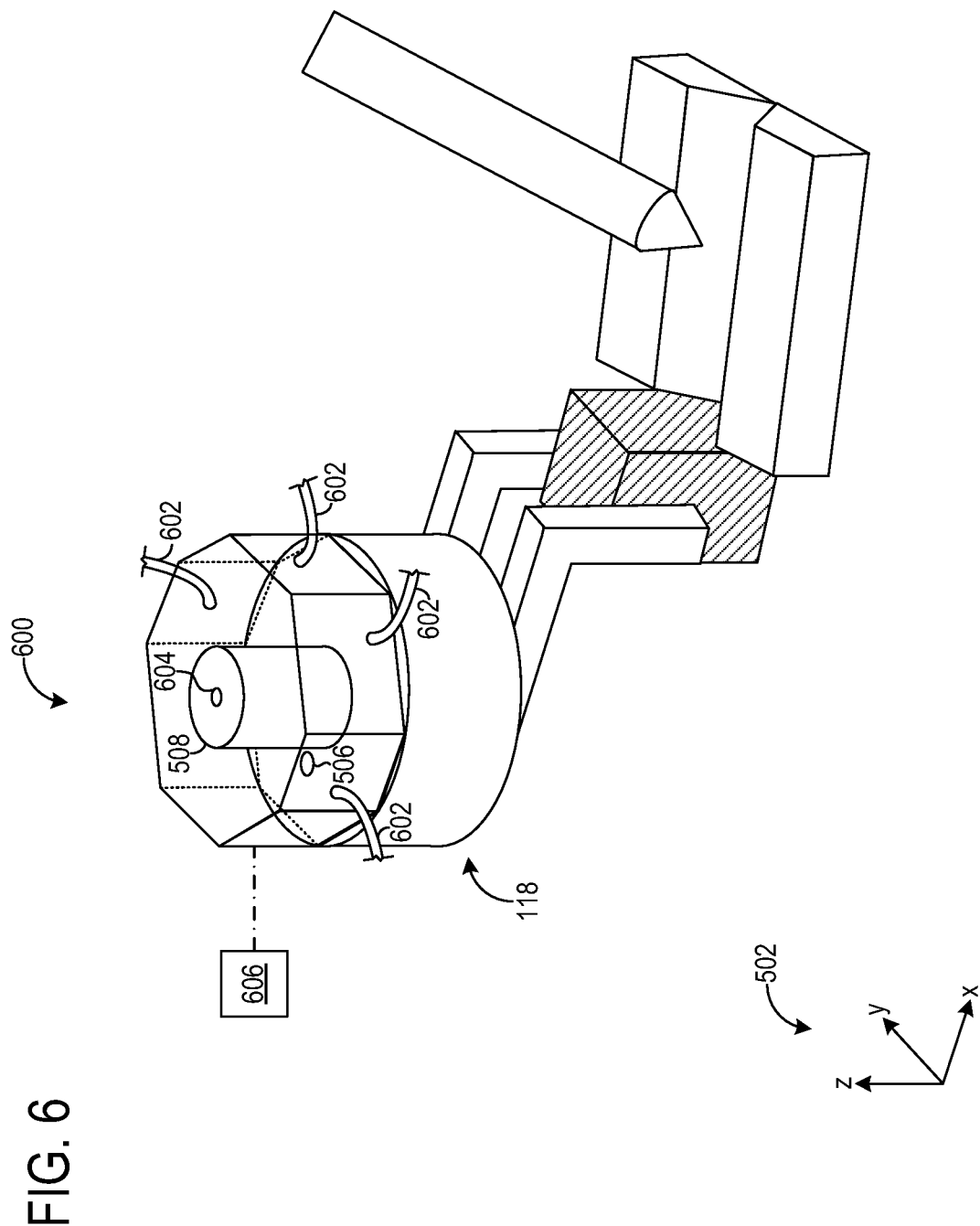
FIG. 6 schematically shows an actuating robot in accordance with an embodiment of the present disclosure.

Turning now to FIG. 6, an exemplary actuating robot 600 is shown. In this example, actuating robot 600 has a recessed cylinder at its center which is mated and coupled to actuating cylinder 508, thereby coupling actuating robot 600 to compensation device 118. Actuating robot 600 includes four pneumatic tubes 602 configured to receive a fluid (e.g., pressurized air) from a pneumatic supply device (e.g., an air compressor), though the number of pneumatic tubes may be varied without departing from the scope of this disclosure. Pneumatic tubes 602 are further configured to transmit received fluid to components of compensation device 118, including pressure shaft 506. One or more of pneumatic tubes 602 may further be coupled to a pneumatic orifice 604, which is a hollow opening disposed at the top of actuating cylinder 508 configured to receive fluid and thereby drive actuating cylinder 508. In this way, compensation device 118 may be endowed with the four degrees of freedom described above, with pressure shaft 506 driving linear motion along the x and y axes, actuating cylinder driving linear motion along the z-axis, and rotation groove 510 driving rotational motion about the z-axis. Although embodiments in which actuating robot 600 is a pneumatic device are described, it will be understood that its functionality may instead be carried out by other suitable means without departing from the scope of this disclosure, for example by servo, electrical, or hydraulic means, or via a mechanical gearbox.

Actuating robot 600 may be operatively coupled to or include a controller 606 to carry out the functionality described above in addition to commands described below. Controller 606 may be, for example, controller 700 described below with reference to FIG. 7. Controller 606 first includes a "center" command which may be issued after the completion of a previous compensation sequence in which an object (e.g., a weld dam) gripped by compensation device 118 has been sufficiently abutted against a workpiece. Upon issuance of the center command, compensation device 118 may be offset along the z-axis in the x-y plane by an angle. The center command then causes actuating robot 600 to re-center compensation device 118 along the z-axis and in the x-y plane, resetting the angle to zero. The zero value of the angle may be predetermined in any suitable way, and may be determined with reference to the terminal end surface of a workpiece, for example.

Controller 606 next includes a "lock" command, which locks compensation device 118 to a desired angle in the x-y plane. The angle may be optimized for abutting an object against a workpiece. The angle may further be maintained as long as fluid is continually supplied to pressure shaft 506, for example.

Controller 606 further includes lock and unlock commands, which lock and unlock compensation device 118 to/from any desired orientation achievable via its degrees of freedom.

Controller 606 finally includes a "stroke" command, which drives compensation device 118 a desired amount through the z-axis. In other words, the stroke command may be issued to vertically adjust the height of compensation device 118.

The above described commands may be issued in any desired order to achieve the functionality described above, particularly including sufficiently abutting an object against a workpiece. In the embodiments in which actuating robot 600 is a pneumatic device, such commands may be individually tied to a single pneumatic tube 602. In this example, each pneumatic tube 602 exclusively implements one of the center, lock, unlock, or stroke commands. Alternatively, two, three, or all of pneumatic tubes 602 may receive and transmit fluid cooperatively to carry out such commands.

Figure 7:
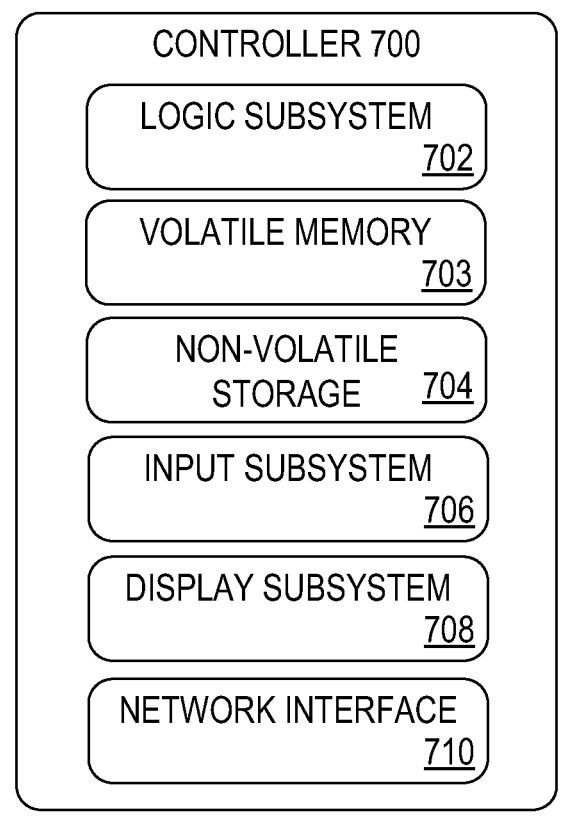
FIG. 7 schematically shows an exemplary controller in accordance with an embodiment of the present disclosure.

Turning now to FIG. 7, an exemplary controller 700 is schematically shown, which may be used to carry out the methods described above.

Controller 700 is shown in simplified form. It will be understood that virtually any computer architecture may be used without departing from the scope of this disclosure. In different embodiments, controller 700 may take the form of a mainframe computer, server computer, desktop computer, laptop computer, tablet computer, home-entertainment computer, network computing device, gaming device, mobile computing device, mobile communication device (e.g., smart phone), etc.

Controller 700 includes a logic subsystem 702, volatile memory 303, and a non-volatile storage subsystem 704. Controller 700 may also include a display subsystem 708, input subsystem 706, and network interface 710, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Volatile memory 703 may include devices such as RAM that are used to temporarily contain data while it is being processed by the logic subsystem. It will be appreciated that data stored in volatile memory 703 is typically lost when power is cut.

Non-volatile storage subsystem 704 includes one or more physical devices configured to hold data and/or instructions in a non-volatile manner to be executed by the logic subsystem to implement the methods and processes described herein. Non-volatile storage subsystem 704 may include computer readable media (e.g., CD, DVD, HD-DVD, Blu-Ray Disc, FLASH memory, EEPROM, ROM, etc.), which may include removable media and/or built-in devices that hold instructions in a non-volatile manner, and thus continue to hold instructions when power is cut to the device. Non-volatile storage subsystem 704 may include other storage devices such as hard-disk drives, floppy-disk drives, tape drives, MRAM, etc.).

In some embodiments, aspects of the instructions described herein may be propagated over a communications medium, such as a cable or data bus, in a transitory fashion by a pure signal (e.g., an electromagnetic signal, an optical signal, etc.) that is not held by a physical device for a finite duration.

The terms "module," "program," and "engine" may be used to describe a software aspect of controller 700 implemented to perform a particular function. In some cases, a module, program, or engine may be instantiated via logic subsystem 702 executing instructions held by non-volatile storage subsystem 704, using portions of volatile memory 703. It will be understood that the terms "module," "program," and "engine" may encompass individual or groups of executable files, data files, libraries, drivers, scripts, database records, etc.

Display subsystem 708 may include one or more displays, which may be integrated in a single housing with the remaining components of the controller 700, as is typical of smart phone applications, laptop computers, etc., or may be separated and connected by a wired or wireless connection to the computing device, as is typical of desktop computers. The displays may be touch-sensitive for input, in some examples.

Input subsystem 706 may comprise or interface with one or more user-input devices such as a keyboard, mouse, touch screen, etc.

Network interface 710 may be configured to communicatively couple controller 700 with one or more other computing devices via a computer network, such as the Internet, utilizing a wired or wireless connection.

It is to be understood that the configurations and/or approaches described herein are exemplary in nature, and that these specific embodiments or examples are not to be considered in a limiting sense, because numerous variations are possible. The embodiments described above and the embodiments illustrated in the drawings serve as examples of the variety of different devices. The subject matter of the present disclosure includes all novel and nonobvious combinations and subcombinations of the various configurations, features, functions, and/or properties disclosed herein, as well as any and all equivalents thereof.

The invention claimed is:

1. A method for automating weld termination, comprising:
    gripping via a compensation device a weld dam comprised of silicon dioxide;
    imparting via the compensation device linear motion along an x-axis, a y-axis, and a z-axis, and rotational motion about the z-axis, to the weld dam;
    abutting via imparted motion the weld dam against a surface of a workpiece, the workpiece comprising a first section and a second section.

2. The method of claim 1, wherein the surface includes uneven terminal ends of the first and second sections.

3. The method of claim 1, wherein the surface is a bottom surface.

4. The method of claim 1, further comprising:
    gripping via the compensation device a weld backer comprised of silicon dioxide;
    imparting the linear and rotational motion to the weld backer; and
    abutting via the imparted motion the weld backer against a bottom surface of the workpiece.

5. The method of claim 4, further comprising moving the weld backer in a weld direction as a weld is carried out.

6. The method of claim 5, wherein the weld backer is moved continuously.

7. The method of claim 4, wherein the weld dam and the weld backer are contiguous.

8. The method of claim 1, wherein the linear motion along the x-axis and the y-axis is controlled by a pressure shaft, the linear motion along the z-axis is controlled by an actuating cylinder, and the rotational motion about the z-axis is facilitated by a rotation groove.

9. The method of claim 8, wherein the pressure shaft is operatively coupled to an actuating robot.

10. The method of claim 8, wherein the actuating cylinder is one of an air cylinder, a spring, servo-driven, electrically-driven, mechanically-driven, or hydraulically-driven.

11. A weld compensation device for automating weld termination, comprising:
    a weld dam comprised of silicon dioxide;
    a compensation device imparting motion to the weld dam, the motion including linear motion along an x-axis, a y-axis, and a z-axis, and rotational motion about the z-axis;
    a workpiece comprising a first section and a second section, a surface of the workpiece abutted against the weld dam.

12. The device of claim 11, wherein the surface includes uneven terminal ends of the first and second sections.

13. The device of claim 11, wherein the surface is a bottom surface.

14. The device of claim 11, wherein the weld dam further includes a weld backer.

15. The device of claim 11, further comprising:
    a logic subsystem configured to execute instructions;
    a storage subsystem holding instructions executable by the logic subsystem to:
        determine a position based on a spatial fixture;
        obtain and detect initial contact with the first section or the second section; and
        obtain and detect secondary contact with a remaining section based on one or more heuristics.

16. The device of claim 11, wherein the linear motion along the x-axis and the y-axis is controlled by back pressure generated in a pressure shaft.

17. The device of claim 11, wherein the pressure shaft is operatively coupled to an actuating robot.

18. The device of claim 11, wherein the linear motion along the z-axis is controlled by an actuating cylinder.

19. The device of claim 17, wherein the actuating cylinder is an air cylinder.

20. The device of claim 11, wherein the rotational motion along the z-axis is facilitated by a rotation groove.

* * * * *